J. J. REBILAS.
LOCK.
APPLICATION FILED DEC. 13, 1916.

1,234,488.

Patented July 24, 1917.
3 SHEETS—SHEET 1.

Inventor
J. J. Rebilas

Attorney

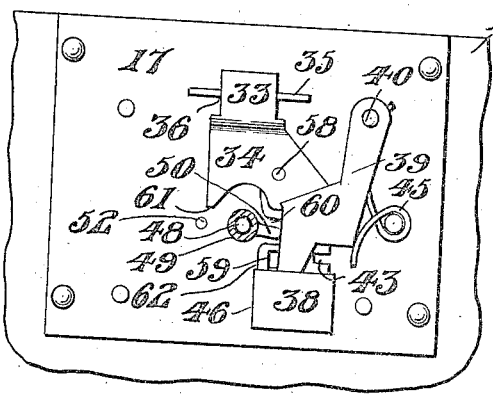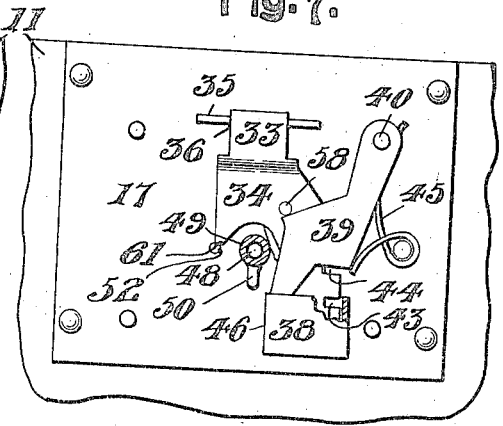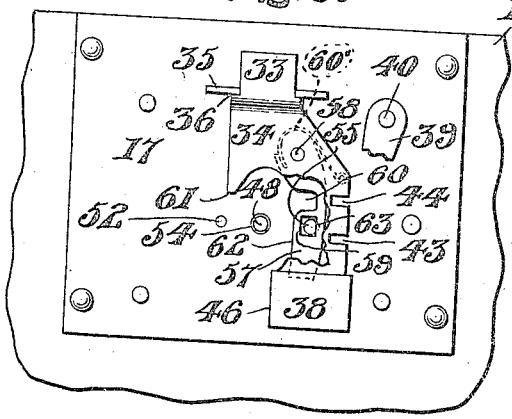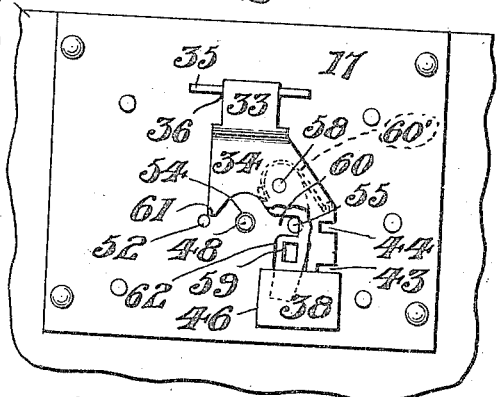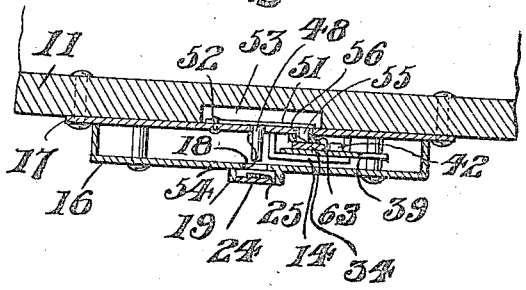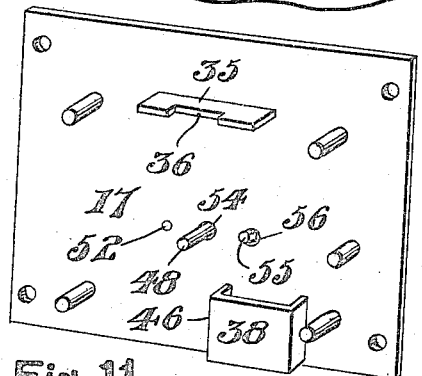

J. J. REBILAS.
LOCK.
APPLICATION FILED DEC. 13, 1916.
1,234,488.
Patented July 24, 1917.
3 SHEETS—SHEET 3.
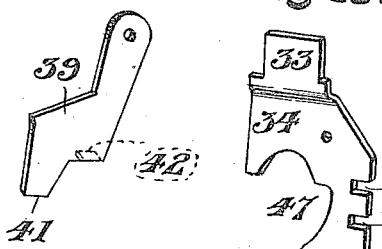
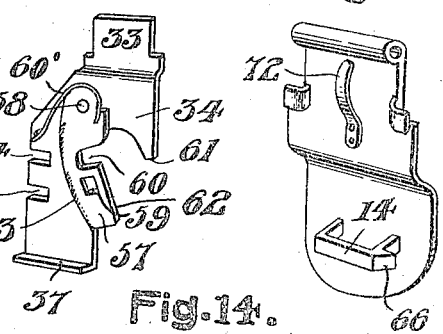
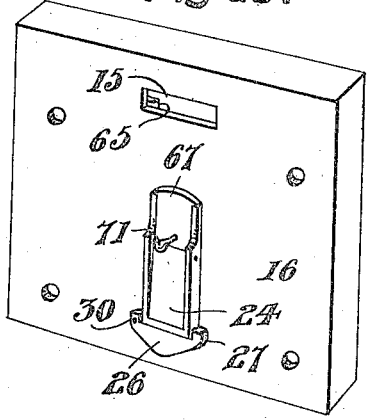
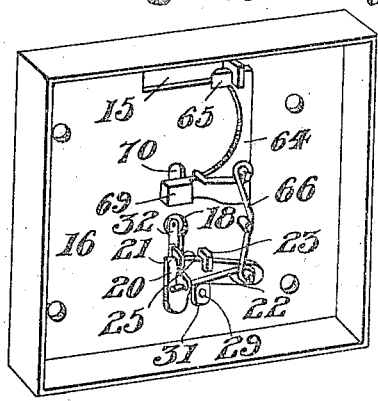
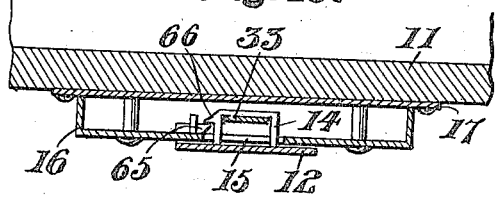
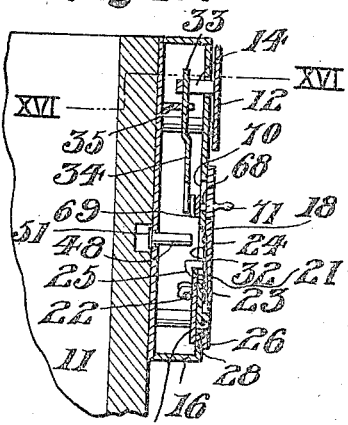
Inventor
J. J. Rebilas
By N. M. Wilson
Attorney

UNITED STATES PATENT OFFICE.

JACOB J. REBILAS, OF SHAMOKIN, PENNSYLVANIA.

LOCK.

1,234,488.  Specification of Letters Patent.  Patented July 24, 1917.

Application filed December 13, 1916. Serial No. 136,590.

*To all whom it may concern:*

Be it known that I, JACOB J. REBILAS, a subject of the Emperor of Austria, residing at Shamokin, in the county of Northumberland and State of Pennsylvania, have invented certain new and useful Improvements in Locks, of which the following is a specification.

This invention relates to certain new and useful improvements in locks.

The primary object of the invention is the provision of a lock adaptable for general use but which is readily employed as a trunk and box lock, provision being made whereby a person unfamiliar with the lock will be unable to operate the same, a specially designed key-hole guard being provided as well as an auxiliary hasp catch, the main lock mechanism including safety arrangements.

A further object of the device is the provision of a trunk lock to the mechanism of which an unauthorized person will not have ready access, and which mechanism cannot be readily picked by reason of its inclusion of specially operable safety appliances, a separately operable retaining catch being provided for the hasp which is necessarily released after the mechanism is unlocked before separating the hasp from the latter so as to open the trunk.

The present construction employable as a trunk lock provides a cover guard member for the key-hole adapted to be closed when the device is locked, the same being releasable in a special manner whereby an unauthorized person will be prevented from having access to the key-hole. The mechanism of the lock cannot then be actuated without releasing a safety member by inwardly pressing upon the key post while thereafter the authorized key will readily shift the bolt. A specially operable auxiliary catch for the shackle may then be operated to release the latter. When the bolt is again projected, the safety device is re-set by the key, the auxiliary catch having engaged the hasp when the latter was closed, while the device is returned to its original position by closing the key-hole guard.

In the drawing forming a part of this application and in which like designating characters refer to corresponding parts throughout the several views:—

Fig. 6 shows the mechanism with the bolt partially retracted by the key.

Fig. 7 illustrates the mechanism with the bolt entirely retracted, portions being broken away.

Fig. 8 is a view similar to Fig. 3 with portions of the bolt and tumbler removed.

Fig. 9 is a view similar to Fig. 7 with the tumbler removed and the bolt partially broken away.

Fig. 10 is a transverse sectional view taken upon line X—X of Fig. 1.

Fig. 11 is a perspective view of the base or back plate of the lock.

Fig. 12 is a perspective view of the casing or cover plate removed showing the key-hole guard in its open position.

Fig. 13 is a view similar to Fig. 12 with the key-hole guard closed.

Fig. 14 is a rear perspective view thereof.

Fig. 15 is a sectional view taken upon line XV—XV of Fig. 1.

Fig. 16 is a transverse sectional view taken upon line XVII—XVII of Fig. 15.

Fig. 17 is a perspective view of the hasp detached.

Fig. 18 is a perspective view of the bolt member.

Fig. 19 is a rear perspective of the bolt with the latch mounted thereon, and,

Fig. 20 is a perspective view of the dog detached.

Figure 1:
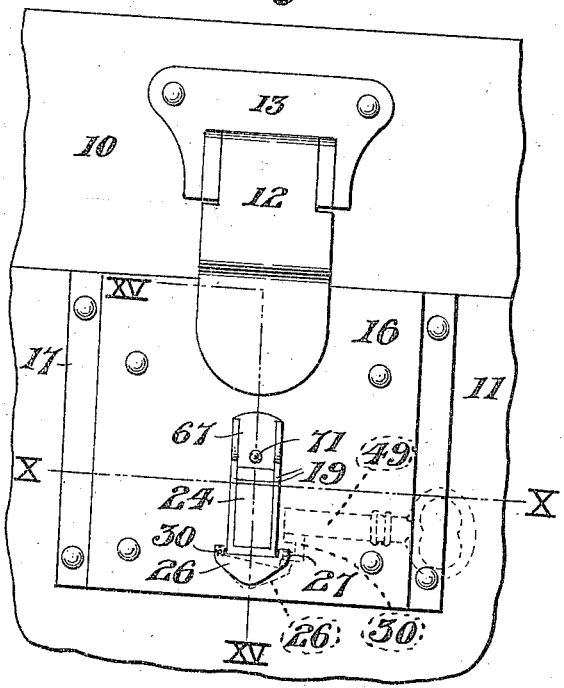
Figure 1 is a front elevation of a portion of a trunk provided with the present device in its locked arrangement, the operation of releasing the key-hole guard being illustrated by dotted lines.
Figure 2:
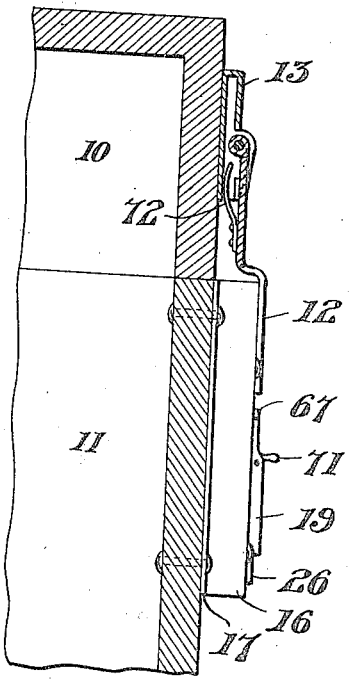
Fig. 2 is a vertical central sectional view thereof with portions of the device shown in side elevation.

The present device is herein illustrated in the form of a securing means for the lid or cover 10 of a trunk 11, the invention broadly comprising the substantially usual form of hasp secured to the lid 10 by means of a plate 13 and having a keeper or staple 14 positionable through a receiving slot 15 of the cover or casing plate 16 of the lock, the said plate being secured to a base or back plate 17 attached to the trunk 11 and adapted for housing therein the main mechanism of the lock.

The device in its retaining arrangement with the hasp in its locked position is best illustrated in Fig. 1 of the drawings and the first step in releasing the hasp being to gain access to the key-hole of the lock, the guard mechanism for the key-hole will be first described.

A key-hole slot 18 is provided in the casing plate 16 beneath the locking slot 15 and a U-shaped frame 19 is secured to the plate around said slot. A detent 20 is pivoted at one end within the casing 16 having its upper edge 21 normally maintained inwardly of the lower portion of the key-hole slot 18 by means of a spring 22, a guide 23 being provided for the detent. A guard plate 24 is hinged within the frame 19 for covering the key-hole 18 and is provided with a hook 25 for engaging the detent edge 21 and depressing the detent for engagement therewith when the plate 24 is in its closed position as best illustrated in Figs. 1 and 13 of the drawings. A substantially triangular releasing plate 26 is mounted beneath the frame 19 normally inclosing the lower end thereof between terminal ears 27 carried thereby. The plate 26 is secured to the detent 20 through a slot 28 in the plate 16 whereby downward pressure on the plate 26 releases the detent 20 from the hook 25 for imparting a substantially bodily rather than pivotal movement to the plate 26. A pin 29 is extended through a slot in the plate 16 having its outer end attached as at 30 to one of the plate ears 27 while its inner end has a head 31 adapted to be engaged within a corresponding notch in the lower side of the detent 20 when the latter is depressed, preferably by pressing downwardly upon the ear 27 opposite the pin connection 30, as best illustrated by dotted lines in Fig. 1 of the drawing. A small leaf spring 32 is arranged beneath the cover plate 24 being of hook form to accommodate the operation of the hook 25 and being compressed when the plate 24 is closed whereby upon releasing the said plate, the spring 32 throws the plate 24 to its open position as illustrated in Fig. 12 of the drawings whereby free access can be had to the key-hole slot 18. The plate 24 may readily close by pressing the same when desired, the detent 20 then automatically operating to retain the same.

A sliding bolt 33 having an enlarged substantially L-shaped extension 34 is slidably mounted upon the base plate 17 by means of a block 35 having a slot 36 therein within which the bolt 33 is adapted to be shifted, the free end of the extension 34 having an angular flange 37 with the flange carried end of the extension shiftably arranged within a guard loop 38.

Figure 3:
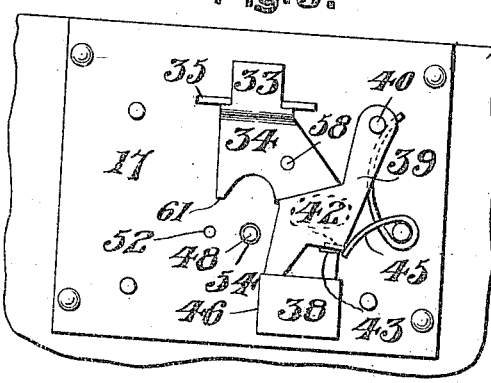
Fig. 3 is a front view of the lock with the cover casing removed showing the mechanism in its normal locked arrangement.

A dog 39 is pivoted as at 40 to the plate 17 having a toe 41 arranged within the loop 38 and with a retaining lug 42 adapted for engaging selectively the slots 43 and 44 in the outer edge of the bolt 34 for maintaining said bolt in its projected or retracted positions respectively. A spring 45 bears against the dog 39 for normally maintaining the lug 42 within whichever one of said notches or slots 43 and 44 the same alines and with the toe 41 engaging the inner end or wall 46 of the loop 38, as best illustrated in Figs. 3 and 7 of the drawings.

Figure 4:
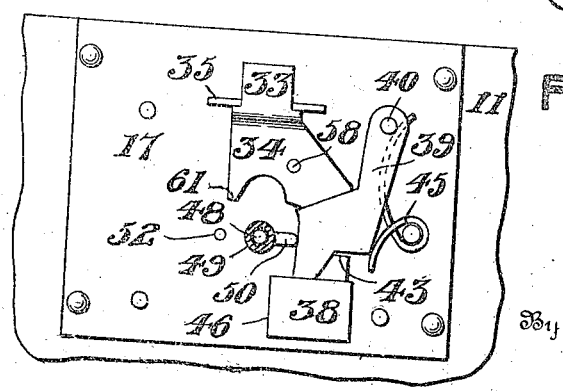
Fig. 4 is a similar view showing the key in position with the mechanism inoperative.

The bolt 34 has a substantially semicircular cut-away portion or recess 47 in the side thereof opposite the notches 43 and 44 adapted to accommodate an outwardly projecting key post 48 and being of sufficient dimensions to allow the key 49 with its bit 50 to revolve freely upon the said post when the bolt 34 is projected as well as to freely turn in the locking direction when the bolt is retracted. The aforementioned key post 48 is mounted upon a spring 51 secured as at 52 to the rear face of the base plate 17 within a chamber 53 formed in the adjacent face of the trunk 11, as illustrated in Fig. 10 of the drawings, the key post 48 freely extending through a perforation 54 in the base plate 17. The said spring 51 has an engaging stud 55 upon its free end projecting through an opening 56 in the plate 17 and constituting a latch or guard for a supplemental piece or tumbler 57 pivoted as at 58 to the rear face of the bolt 34 and arranged with an opening 59 for the reception of the stud 55. A leaf spring 60' attached to the tumbler 57 engages with the bolt 34 tending to move the member 39 toward the key post 48. From this arrangement it will be understood that when the tumbler 57 is engaged by the stud 55 as illustrated in Fig. 10, the key bit 50 may be freely turned without engaging either the tumbler 57 or the bolt 34, when the latter is projected, although slightly shifting the dog 39 pivotally as illustrated in Fig. 4. By pressing inwardly upon the post 48, the latch is released by removing the stud 55 from the opening 59 of the tumbler 57 whereupon the spring 60 moves said tumbler toward the post 48 within the path of movement of the key bit.

When the tumbler 57 is so released with the bolt 30 projected, the turning of the key 49 in the releasing direction engages the bit 50 within the adjacent side notch 60 of the tumbler 57 whereby a further downward movement of the bit by continuing rotation of the key retracts the bolt 34 and at the same time swings the dog 39, releasing the lug 42 from the notch 43 of the bolt while upon a disengagement of the key bit from the dog 39 allows the lug 42 to seat within the upper notch 44 of the bolt locking the latter in its retracted position.

A further turning of the key in the same direction is prevented when the bolt is retracted by the engagement of the key bit 50 with a stop shoulder 61 formed upon the bolt 34. A reverse movement of the key releases the lug 42 from the notch 44 of the bolt and by engaging within the opening 60 of the tumbler 57 forces the bolt 33 outwardly whereupon the spring 45 again returns the dog 39 with its lug 42 engaging within the upper notch 44. The bolt 33 being then in its locked position within the staple 14 of the hasp 12, a subsequent turning of the key in the bolt projecting direction engages the bit 50 thereof against the adjacent edge 62 of the tumbler 57 at a point below the notch 60 thereof which swings the said tumbler upon its pivot 58 against the action of the spring 60 in a direction toward the bolt notches 43 and 44, forcing the edge portion 63 of the tumbler 57 over the inclined face of the stud 55 thereby engaging the said stud within the opening 59 of the tumbler. Any further turning of the key upon the post 48 only results in slightly shifting the dog 39 without contacting or influencing either the bolt 33 or the tumbler 57.

An auxiliary catch is arranged for the hasp 12 being in the form of a pivoted lever 64 arranged within the casing 16 and having a locking lug 65 resiliently maintained by means of an extension 65′ of the aforementioned spring 22 normally within the locking path of movement of a side projection 66 carried by the hasp loop 14. By this arrangement it will be seen that by merely closing the hasp 12 and forcing the loop 14 through the slot 15, the projection 66 is automatically engaged by the catch lug 65. A slide plate 67 is shiftably arranged within the frame 19 adjacent the upper end of the cover plate 24 and is attached by a pin 68 with the inner end 69 of the lever 64 through a slot 70 in the casing plate 16. A projecting handle 71 is carried by the slide 67 by means of which the slide may be moved upwardly against the action of the spring portion 66, thereby shifting the lever 64 upon its pivot, releasing the lug 65 from the projection 66 of the loop 14, which allows the spring 72 of the hasp 12 to move the latter outwardly in the event that the bolt 33 is retracted.

Figure 5:
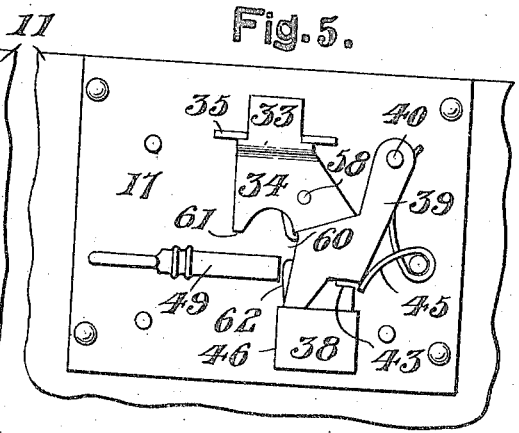
Fig. 5 is a similar view showing the key as having released the safety latch by depressing the post.

The complete operation of the device will be apparent from this detailed description of the construction and function of each portion thereof, it being understood that the key-hole guard is first actuated and then the main mechanism of the lock while the hasp 12 cannot be removed for opening the lid 10 until the auxiliary catch has been released. As indicated, when the device is locked as illustrated, in Fig. 1, the right-hand ear 27 of the plate 26 is pressed downwardly for releasing the guard plate 24 which flies open to the position shown in Fig. 12. The key post 48 is then pushed inwardly, for instance, by the key as shown in Fig. 5, which releases the latch from the tumbler 57 allowing the latter to move within the path of movement of the key bit 50 so that the proper turning of the key 49 retracts the bolt as hereinbefore fully set forth. The bolt is again projected by a reverse movement of the key while a second turn of the key in the same direction forces the contact plate into engagement with the catch stud 55 so that no further actuation of the bolt is possible by means of the key until after the latch is released by exerting pressure upon the post 48. When the guard plate 24 is opened and the bolt 33 is retracted, the hasp 12 is not released until the auxiliary catch has been moved to its released position which may be easily accomplished by further swinging the plate 32 upwardly upon its hinge, thereby engaging the handle 71, pushing the slide 67 upwardly and moving the locking lug 65 out of engagement with the projection 66 of the loop 14. The hasp 12 being thereby released, the spring 72 swings the hasp outwardly of the receiving slot 15 of the casing plate 16 with the loop 14 removed therefrom. A substantial reversal of said operations results in locking the device, it being seen that the hasp 12 is automatically retained by the auxiliary catch by forcing the loop 14 within the slot 15 while the bolt 33 is projected and the latch reëngaged with a stud 55 by two turns of the key 49 in the proper direction as heretofore noted. Thereafter, the plate 24 is pressed down within the frame 19 over the key-hole slot 18 completing the locking operation.

The entire device normally having the appearance shown in Fig. 1 when locked, any person unfamiliar with the device will be at a loss to understand how access is to be gained to the key-hole and even after solving this difficulty, the latch mechanism of the lock will be a further hindrance to actuating or picking the same. After the bolt 33 is released, a person will still be unaware of the manner in which the hasp 12 is disengaged from the auxiliary catch while it will be also seen that the said auxiliary catch may be employed by the owner when desired for maintaining the hasp 12 in its closed position without employing the locking bolt 33 although the key-hole guard plate 24 may be closed at such times if found desirable, providing a finished appearance to the device when either the auxiliary catch is in operation or the locking bolt 33 or both of the same.

What I claim as new is:—

1. A device of the class described comprising in combination with a lock casing and a hasp, locking bolt mechanism for the said hasp, an auxiliary spring engaging catch for the hasp, and a key-hole guard for the casing having a releasing path of movement within the plane of said auxiliary catch.

2. A device of the class described comprising a lock casing, a hasp adapted for co-operation therewith, a spring catch for the said hasp carried by the casing, releasing means for the said catch, and a key-hole guard hinged to the said casing and having a releasing path of movement within the plane of said releasing means.

3. An auxiliary catch for hasp locks comprising in combination with a hasp having a loop adapted for insertion within the receiving slot of a lock casing, a U-shaped frame upon the said casing, a slide shiftably arranged within the said frame, an operating handle projecting from the said slide, a lateral projection carried by the said loop arranged within the said casing when the hasp is closed, a lever pivotally arranged within the casing and having a locking lug at one end thereof normally positioned inwardly of the casing slot within the entering path of movement of said projection, an operating spring for the said lever, and operative connections between the inner end of said lever and the said slide.

4. An auxiliary catch for hasp locks comprising in combination with a hasp having a loop adapted for insertion within the receiving slot of a lock casing, a U-shaped frame upon the said casing, a slide shiftably arranged within the said frame, an operating handle projecting from the said slide, a lateral projection carried by the said loop arranged within the said casing when the hasp is closed, a lever pivotally arranged within the casing and having a locking lug at one end thereof normally positioned inwardly of the casing slot within the entering path of movement of said projection, an operating spring for the said lever, operative connections between the inner end of said lever and the said slide, the said casing being provided with a key-hole slot within the said frame, a locking detent normally resiliently positioned inwardly of said key-hole slot, a releasing member attached to the said detent arranged outwardly of the casing having ears normally arranged laterally of said frame, a cover plate for said key-hole hinged within said frame, a hook upon the said cover plate adapted for automatic engagement with the said detent when the plate is closed within the said frame, a shifting spring for the said cover plate, the upward swinging path of movement of the said plate being within the releasing path of movement of the said slide handle for the catch.

5. A device of the class described comprising a lock casing having a key-hole slot, a U-shaped frame upon said casing within which said slot is arranged, a locking detent normally resiliently positioned inwardly of said key-hole slot, a releasing member attached to the said detent arranged outwardly of the casing having ears normally arranged laterally of said frame, a cover plate for said key-hole hinged within said frame, a hook upon the said cover plate adapted for automatic engagement with the said detent when the plate is closed within the said frame, and a shifting spring for the said cover plate.

6. A hasp lock comprising a casing having a key-hole slot, a spring mounted key post arranged inwardly of said slot, a latch stud operatively connected to the said post, a slide bolt within the casing, a key engaging plate pivoted to the said bolt and having a keeper opening for the said stud adapted for the reception of the stud when the bolt is projected and the said plate is outwardly of the path of key movement of the lock, the said bolt having a cut-away side portion adapted for the free rotation of a key therein and further having receiving notches upon its opposite edge, a guard loop over the lower end of the said bolt, a pivotally arranged tumbler having a toe arranged within the said loop, and an angularly projecting lug upon said tumbler adapted for engagement with the upper or lower one of said notches when the bolt is either entirely retracted or projected.

In testimony whereof I affix my signature.

JACOB J. REBILAS.

Copies of this patent may be obtained for five cents each, by addressing the "Commissioner of Patents, Washington, D. C."